United States Patent
Kim et al.

(10) Patent No.: US 10,916,795 B2
(45) Date of Patent: Feb. 9, 2021

(54) BATTERY MODULE ASSEMBLY AND MANUFACTURING METHOD THEREFOR

(71) Applicant: SK Innovation Co., Ltd., Seoul (KR)

(72) Inventors: Deok Soo Kim, Daejeon (KR); Kyoung Min Cho, Incheon (KR); Sung Chul Park, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 769 days.

(21) Appl. No.: 14/419,558

(22) PCT Filed: Aug. 20, 2013

(86) PCT No.: PCT/KR2013/007466
§ 371 (c)(1),
(2) Date: Feb. 4, 2015

(87) PCT Pub. No.: WO2014/030910
PCT Pub. Date: Feb. 27, 2014

(65) Prior Publication Data
US 2015/0214569 A1    Jul. 30, 2015

(30) Foreign Application Priority Data

Aug. 20, 2012 (KR) .......................... 10-2012-0090672

(51) Int. Cl.
*H01M 10/04* (2006.01)
*H01M 10/6551* (2014.01)
(Continued)

(52) U.S. Cl.
CPC ..... *H01M 10/0413* (2013.01); *H01M 2/1077* (2013.01); *H01M 2/1252* (2013.01);
(Continued)

(58) Field of Classification Search
CPC ............. H01M 10/0413; H01M 10/48; H01M 10/647; H01M 10/6554; H01M 10/625;
(Continued)

(56) References Cited

U.S. PATENT DOCUMENTS 8,597,825 B2   12/2013   Buck et al.
8,951,660 B2    2/2015   Choo et al.
(Continued)

FOREIGN PATENT DOCUMENTS

JP    2005-032786 A    2/2005
JP    2009147187 A    7/2009
(Continued)

OTHER PUBLICATIONS

English Translation of WO 2011/096677.*
(Continued)

*Primary Examiner* — Milton I Cano
*Assistant Examiner* — Kiran Akhtar
(74) *Attorney, Agent, or Firm* — Abelman, Frayne and Schwab (57) ABSTRACT

A battery module assembly, according to one embodiment of the present invention, comprises: a battery module including a base substrate and at least one battery cell, wherein a plurality of unit battery modules formed to surround a cell cover are stacked on the base substrate; and a battery case which is coupled to the base substrate, and which includes a first case surrounding the front surface of the battery module and a second case combined with the first case and surrounding a rear surface of the battery module. The present invention can effectively provide coupling reliability with an inner sensing membrane which is coupled to the battery module, and can seal the inside of the battery case by tightly combining the first case and the second case in a lateral direction.

5 Claims, 11 Drawing Sheets

(51) Int. Cl.
*H01M 2/10* (2006.01)
*H01M 10/613* (2014.01)
*H01M 10/625* (2014.01)
*H01M 10/647* (2014.01)
*H01M 10/48* (2006.01)
*H01M 10/6554* (2014.01)
*H01M 2/12* (2006.01)

(52) U.S. Cl.
CPC ......... *H01M 10/48* (2013.01); *H01M 10/613* (2015.04); *H01M 10/625* (2015.04); *H01M 10/647* (2015.04); *H01M 10/6551* (2015.04); *H01M 10/6554* (2015.04); *H01M 2220/20* (2013.01); *Y10T 29/4911* (2015.01); *Y10T 29/49108* (2015.01)

(58) Field of Classification Search
CPC ........... H01M 10/613; H01M 10/6551; H01M 2/1252; H01M 2/1077; H01M 2220/20
See application file for complete search history.

(56) References Cited

U.S. PATENT DOCUMENTS

| | | | |
|---|---|---|---|
| 2006/0024575 A1 | 2/2006 | Robinson et al. | |
| 2007/0207369 A1 | 9/2007 | Park et al. | |
| 2008/0318121 A1* | 12/2008 | Takagi | H01M 2/1241 429/120 |
| 2011/0014512 A1* | 1/2011 | Amagai | H01M 2/206 429/159 |
| 2011/0070474 A1* | 3/2011 | Lee | H01M 10/6554 429/120 |
| 2011/0104532 A1* | 5/2011 | Buck | H01M 2/1229 429/82 |
| 2012/0328925 A1* | 12/2012 | Choo | H01M 2/1083 429/99 |
| 2013/0045403 A1* | 2/2013 | Shin | H01M 2/206 429/90 |

FOREIGN PATENT DOCUMENTS

| | | | | |
|---|---|---|---|---|
| JP | 2012-069497 A | | 4/2012 | |
| KR | 000254437 B1 | | 2/2000 | |
| KR | 2007-0112489 A | | 11/2007 | |
| KR | 1020060045444 | * | 11/2007 | .............. H01M 2/10 |
| KR | 1020060045444 | * | 11/2008 | .............. H01M 2/10 |
| KR | 10-2009-0064048 A | | 6/2009 | |
| KR | 20100101762 A | | 9/2010 | |
| KR | 20120021921 A | | 9/2012 | |
| WO | 2008-039554 A2 | | 4/2008 | |
| WO | 2009140199 A2 | | 11/2009 | |
| WO | 2011096677 A2 | | 8/2011 | |
| WO | WO 2011/096677 | * | 8/2011 | .............. H01M 2/20 |
| WO | WO 2011/152668 | * | 8/2011 | .............. H01M 2/02 |
| WO | WO2011096677 | * | 11/2011 | .............. H01M 2/10 |
| WO | WO-2011152668 A2 | * | 12/2011 | .......... H01M 2/1077 |

OTHER PUBLICATIONS

English translation of KR1020060045444.*
International Search Report for Korean Patent Application No. PCT/KR2013/007466 dated Nov. 26, 2013 (2 pages).
Chinese Office Action dated Jun. 15, 2016 for CN 201380043979.4 and English Language Summary (6 pages).
Korean Office Action dated Feb. 8, 2018 for KR1020120090672 and English Language Summary (16 pages).

* cited by examiner

BATTERY MODULE ASSEMBLY AND MANUFACTURING METHOD THEREFOR

RELATED APPLICATIONS

This application is a United States national phase application under 35 USC § 371 of PCT/KR2013/007466 filed on Aug. 20, 2013, and claims the benefit under 35 USC § 119 of Korean patent application number KR 10-2012-0090672 filed Aug. 20, 2012, the disclosures of which are incorporated herein by reference in their entireties.

TECHNICAL FIELD

The present invention relates to a battery module assembly and a manufacturing method therefor.

BACKGROUND ART

A secondary battery generally refers to a battery that can repeatedly perform charging in which chemical energy is converted into electric energy and discharging in which a reverse process to the charging occurs. There are many types of secondary batteries: nickel-cadmium (Ni—Cd) battery, nickel-Hydrogen (Ni-MH) battery, lithium-metal battery, lithium-ion (Ni-ion) battery, and lithium-ion polymer battery (Li-Ion Polymer Battery (hereinafter, referred to as LIPB)).

A secondary battery includes an anode, a cathode, an electrolyte, and a separator. It generates and stores electricity using a difference in voltage between the cathode and anode that are made of different materials. The term "discharging" means movement of electrons from the cathode with a relatively high voltage to the anode with a relatively low voltage, in which the amount of generated electricity corresponds to the voltage difference between the cathode and anode. The term "charging" means reverse movement of electrons, i.e., from the anode to cathode. In the charging process, the anode accepts electrons and lithium ions and changes back to a metal oxide. That is, in a secondary battery, metal atoms move from the anode to cathode through the separator during the charging process, and move reversely from the cathode to anode during the discharging process, resulting in a discharging current flowing.

Recently, secondary batteries are receiving attention as a popular energy source; as they are widely used for IT products, automobiles, and energy storage devices. Secondary batteries for IT products are required to have a long operable time, a small size, and a light weight while secondary batteries for automobiles are required to have high power, durability, and safety so as to be free from risk of explosion during use. In the field of energy storage, secondary batteries are used to store excess electricity which is generated through wind power or solar energy generation. Lithium secondary batteries were developed from the early 1970s and have been put into practical use since 1990 when lithium ion batteries, in which a carbon cathode is used instead of a lithium metal cathode, were developed. The lithium secondary batteries have a long cycle life of more than 500 cycles and a short charging time of 1 to 2 hours. Because of these advantages, lithium ion batteries have recorded the highest increase in selling rate among all secondary batteries. They also feature a lightweight body which is 30 to 40% lighter than nickel-hydrogen batteries. Moreover, lithium secondary batteries are suited to mobile devices because they output the highest voltage (for example, 3.0V to 3.7V) and have high energy density among all existing secondary batteries.

Lithium secondary batteries are categorized into liquid electrolyte batteries and polymer electrolyte batteries according to the type of electrolyte. Batteries using liquid electrolyte are called lithium ion batteries and batteries using polymer electrolyte are called lithium polymer batteries. A case used for a lithium ion battery may be formed of various materials. The case may be cylindrical or prismatic, or it may have a pouch form. A battery assembly is structured such that a cathode and an anode, with a separator interposed therebetween, are stacked or wound into a roll within the case.

In an apparatus such as a vehicle that has a battery module in which many electrode assemblies are stacked, when a pouch cell, which is a part of the electrode assembly, ruptures due to an external impact or internal problems, harmful gases are likely to enter the inside of a vehicle. In addition, as the battery module is formed by simply attaching a one-piece upper cover, reliability of sealing is deteriorated due to, for example, attachment of a sensing member such as a printed circuit board to the battery module.

In addition, when an additional member is inserted or the battery module has a different structure to prevent deterioration in reliability of sealing, assembling precision is lowered due to assembly tolerance that occurs when the battery module is assembled, thereby deteriorating operation performance or driving reliability of a battery module or a device to which the battery module is applied. In addition, when a battery module is structured to be sealed, there is a problem in that it is necessary to use an effective cooling method for cooling the battery module or an effective structure for attaching a cooling device, which is applicable to the battery module, to the battery module.

DISCLOSURE

Technical Problem

Accordingly, the present invention has been made keeping in mind the above problems occurring in the prior art, and an object of the present invention is to provide a battery module assembly and a manufacturing method therefor which can effectively discharge harmful gases, generated from battery cells included in the battery module, outside a battery module and which enables realization of an effective sealing structure, an effective cooling device, and an effective cooling structure for a battery module assembly.

Technical Solution

In order to accomplish the above object(s), one aspect of the present invention provides a battery module assembly including: a base substrate; a battery module that includes a plurality of unit battery modules which is stacked on the base substrate, each unit battery module including one or more battery cells and being covered by a cell cover; and a battery case that is combined with the base substrate and includes a first case and a second case combined with each other, the first case covering a rear surface portion of the battery module, the second case covering a front surface portion of the battery module.

In the battery module assembly according to one aspect: the first case may cover a portion of an upper surface, a first side surface, and portions of left and right side surfaces, which are continuous from the first side surface, of the battery module; the second case may have a shape corresponding to the first case and covers a remaining portion of the upper surface, a second side surface, and remaining portions of the left and right side surfaces, which are continuous from the second side surface, of the battery module; and the first case and the second case may be combined with the base substrate, forming a sealed space in which the battery module is accommodated.

In the battery module assembly according to one aspect, each of the stacked unit battery modules may have a first tab and a second tab for electrical connection, which protrude from a second side surface of the unit battery module, are arranged on the second side surface of the unit battery module, and are distanced from each other.

The battery module assembly according to one aspect may further include a sensing member that is attached to the second side surface of the battery module, on which the first tab and the second tab are formed, and that has a terminal portion to be connected to an external terminal.

The battery module assembly according to one aspect may further include: a heat sink plate that is formed on an outside side surface of the second case and in contact with the cell cover; and a cooling fin attached to the heat sink plate.

The battery module assembly according one aspect may further include a gas discharge tube that is used to discharge harmful gases, generated from the battery module, outside the battery case and that extends from the inside to the outside of the battery case.

In the battery module assembly according to one aspect, the cell cover may be formed of a heat conductive material.

In the battery module assembly according to one aspect, the second case may be combined with the first case such that an inside side surface of the second case presses the sensing member except for the terminal portion.

The battery module assembly according to one aspect may further include a partition that is disposed between the stacked battery cells, at a frame-shaped periphery portion of opposing surfaces of the battery cells, when two or more battery cells are combined with each other.

In order to accomplish the above objects, another aspect of the present invention provides a method of manufacturing a battery module assembly, the method including: preparing a base substrate; combining a first case with the base substrate such that the first case covers a rear surface portion of the base substrate; forming a battery module, in which one or more unit battery modules are stacked, in the first case; attaching a sensing member to a first side surface of the battery module which is not covered by the first case; and combining a second case with a front surface portion of the base substrate such that an inside side surface of the second case comes in pressure contact with the sensing member and the second case faces the first case and accommodates the battery module therein.

The method according to another aspect may further include arranging a gas discharge tube over upper surfaces of the first case and the second case that are combined with each other so as to discharge a gas, generated from the battery module after performing the combining of the second case with the first case.

In the method according to another aspect, each of the stacked unit battery modules may have a first tab and a second tab for electrical connection, which protrude from a second side surface of the unit battery module, are arranged on the second side surface of the unit battery module, and are distanced from each other.

In the method according to another aspect, the sensing member may be attached to the second side surface on which the first tab and second tab are formed, and the sensing member may include a terminal portion to be connected to an external terminal.

In the method according to another aspect, each of the unit battery modules may include one or more battery cells and is covered by a cell cover.

In the method according to another aspect, the cell cover may be formed of a heat conductive material.

In the method according to another aspect: the first case may be combined with the base substrate in a manner of covering a portion of an upper surface, a first side surface, and portions of left and right side surfaces of the battery module; the second case may be combined with the base substrate in a manner of facing the first case, covering a remaining portion of the upper surface, a second side surface, and remaining portions of the left and right side surfaces of the battery module; and the first case and the second case may be combined with the base substrate, forming a sealed space in which the battery module is accommodated.

The above and other objects, features and advantages of the present invention will be more clearly understood from the following detailed description when taken in conjunction with the accompanying drawings.

All terms or words used in the specification and claims have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Advantageous Effects

According to the present invention, a battery case that houses a battery module is made up of a first case and a second case which are combined with each other. This structure improves reliability of attachment of a sensing member such as a printed circuit board.

In addition, since the battery case that houses the battery module is made up of the first case and the second case and since the second case presses and comes into pressure contact with the sensing member attached to battery tabs which serve as electrical connectors of stacked battery cells included in the battery module, it is possible to achieve effective sealing of the battery module.

In addition, the battery module assembly further includes a gas discharge tube which allows harmful gases, generated in the sealed battery module, to be discharged outside. Therefore, it is possible to effectively discharge the harmful gases that are likely to be generated in the sealed battery module assembly.

In addition, a heat sink plate and cooling fins for cooling the battery module are installed on one side surface of the sealed battery module, and a metal cell cover is formed to surround the battery cell to transfer the heat generated from the battery cell to the heat sink plate. Therefore, it is possible to improve cooling efficiency of the battery module assembly.

In addition, since the battery module is sealed by combining the base plate, the first case, and the second case, sealing of the battery module assembly is more effectively achieved. Therefore, it is possible to prevent an error when the battery module assembly is assembled, and it is possible to prevent fault of the battery module assembly and improve productivity of the battery module assembly.

By effectively implementing the sealing and cooling structures for the battery module, it is possible to ensure operation performance and driving reliability of a battery module assembly and a device to which the battery module assembly is applied.

MODE FOR INVENTION

The above and other objects, features and other advantages of the present invention will be more clearly understood from the following detailed description when taken in conjunction with the accompanying drawings. As for reference numerals associated with parts in the drawings, the same reference numerals will refer to the same or like parts through the drawings. It will be understood that, although the terms "one surface," "another surface," "first," "second," etc. may be used herein to describe various elements, these elements should not be limited by these terms. These terms are only used to distinguish one element from another element. Hereinbelow, in the description, details of well-known features and techniques may be omitted to avoid unnecessarily obscuring the presented embodiments.

Hereinbelow, exemplary embodiments of the present invention will be described in detail with reference to the accompanying drawings.

Figure 1:
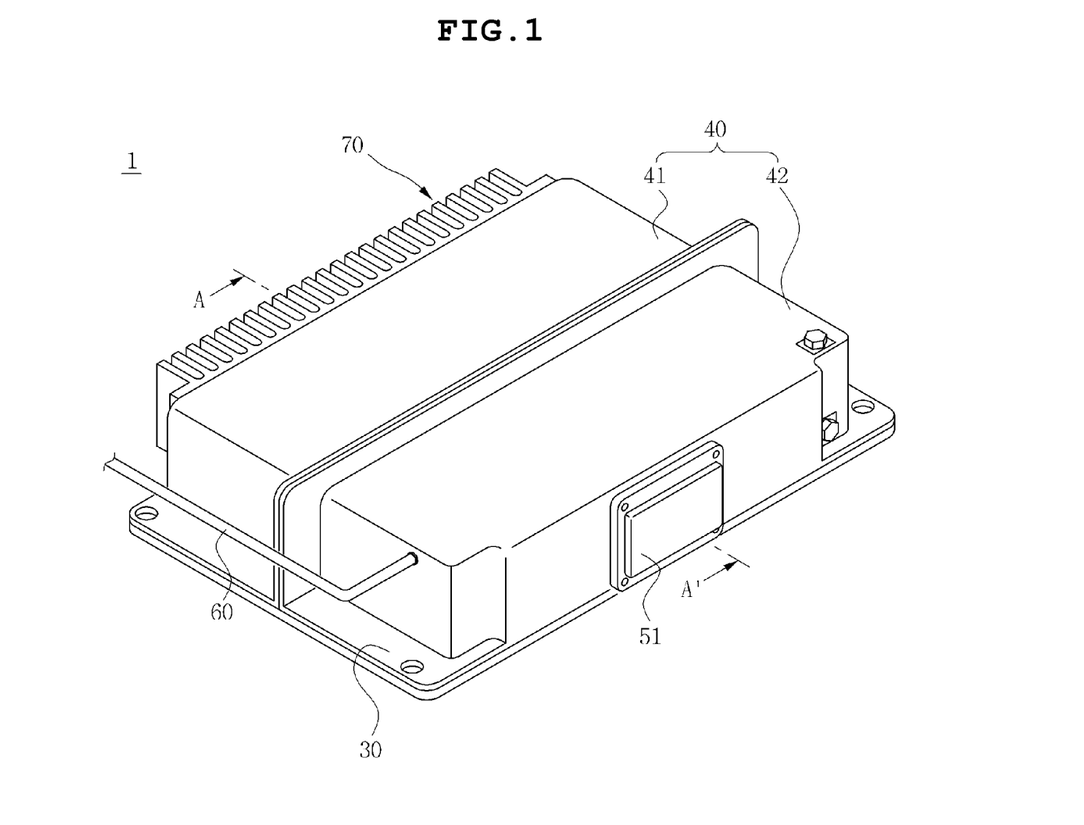
FIG. 1 is a perspective view illustrating a battery module assembly according to one embodiment.
Figure 2:
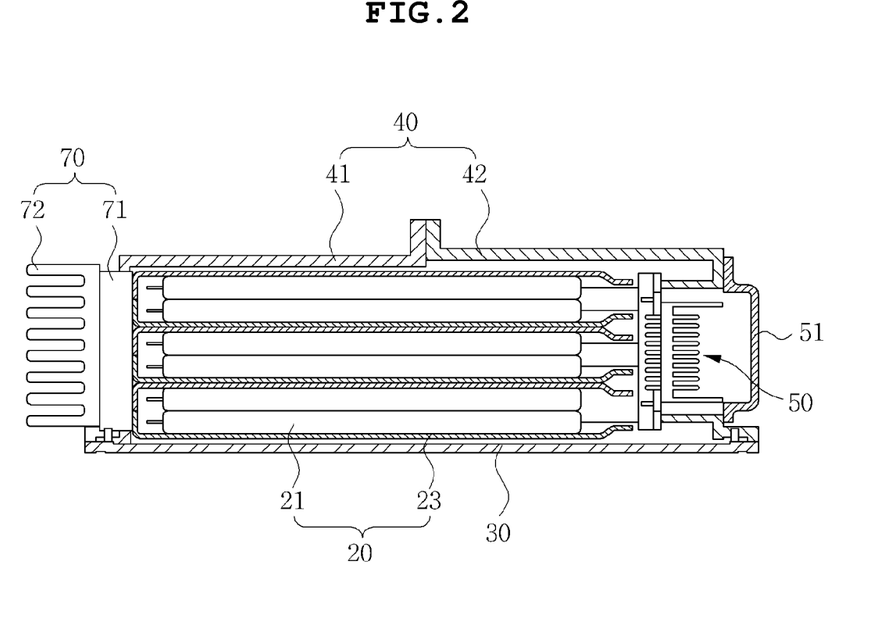
FIG. 2 is a cross-sectional view taken along line AA0' in FIG. 1.
Figure 3:
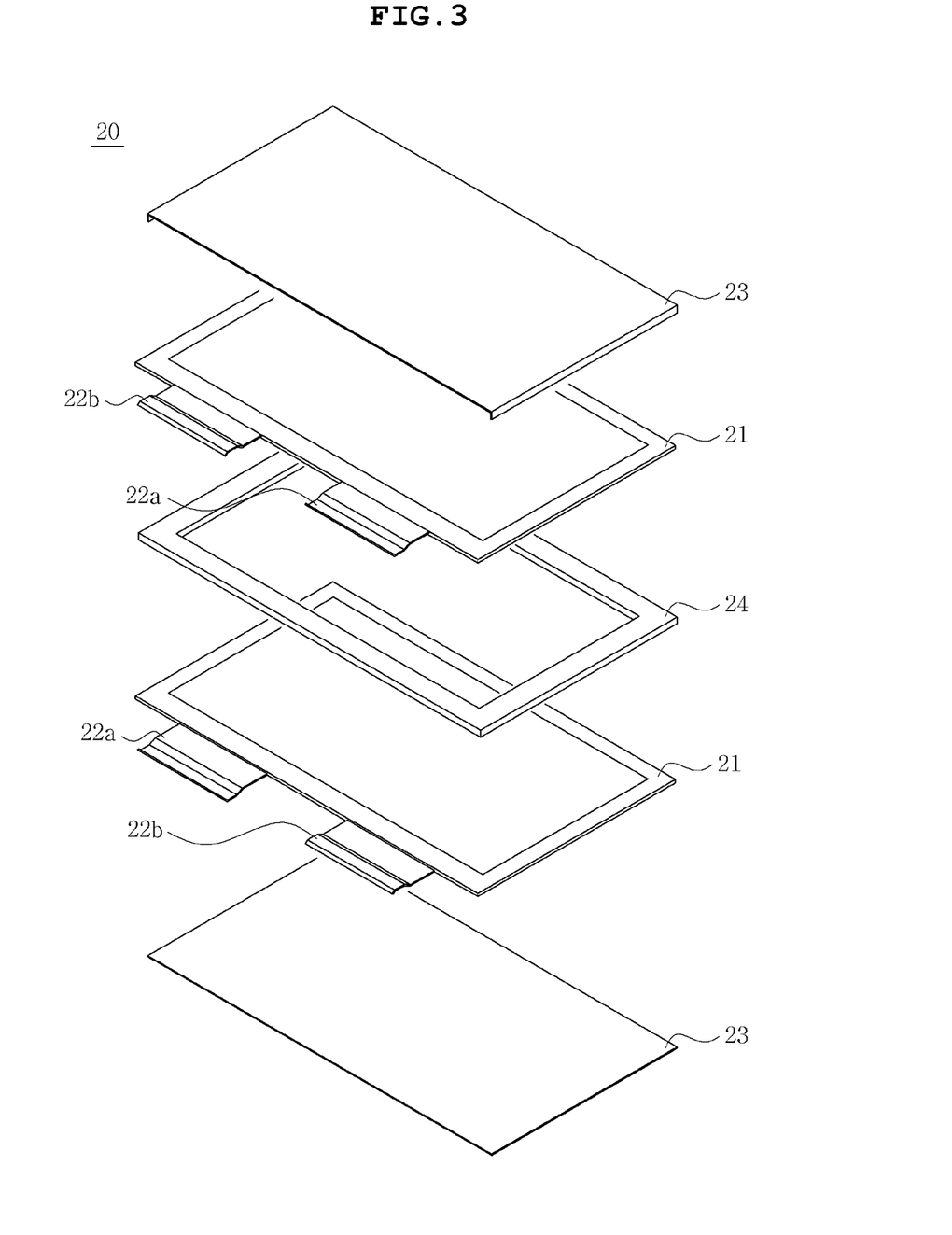
FIG. 3 is an exploded perspective view illustrating a unit battery module according to one embodiment.
Figure 4:
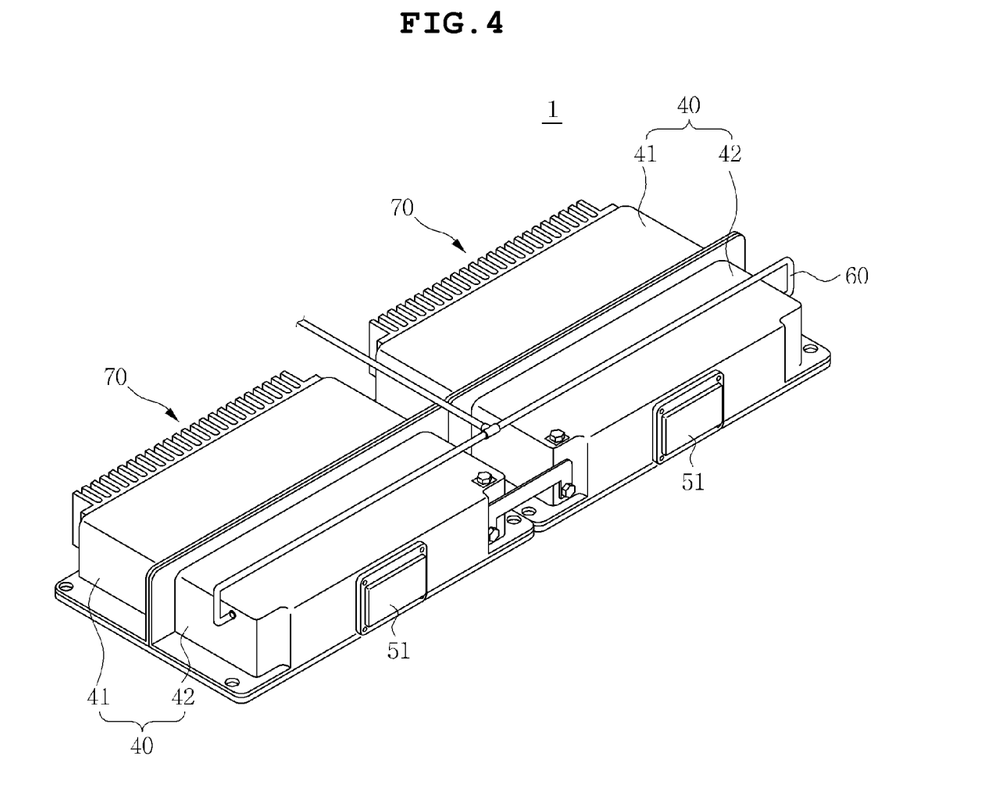
FIG. 4 is a combined perspective view illustrating battery module assemblies, which are connected to each other, according to one embodiment.

FIG. 1 is a perspective view illustrating a battery module assembly according to one embodiment; FIG. 2 is a cross-sectional view taken along line AA0' in FIG. 1; FIG. 3 is an exploded perspective view illustrating a unit battery module according to one embodiment; and FIG. 4 is a combined perspective view illustrating battery module assemblies, which are connected to each other, according to one embodiment.

A battery module assembly 1 according to one embodiment of the present invention includes: a base substrate 30; a battery module 10 including a plurality of unit battery modules 20, each of which includes at least one or more battery cells 21 and is covered by a cell cover 23; and a battery case 40 which is combined with the base substrate 30 and includes a first case 41 and a second case 42. The first case covers a rear surface portion of the battery module 10. The second case 42 covers a front surface portion of the battery module 10 and is combined with the first case 41.

Each battery cell 21 included in the battery module 10 of the battery module assembly according to the present invention may be a secondary battery, such as a lithium secondary battery or a nickel-hydrogen secondary battery, which can be discharged and then recharged. However, the battery cell is not limited to those secondary batteries. Those skilled in the art will appreciate that any one selected from among various kinds of secondary batteries may be used as the battery cell as long as the selected secondary battery is rechargeable. For example, a nickel-hydrogen secondary battery is a secondary battery in which the anode is made of nickel, the cathode is made of a metal alloy for hydrogen storage, and the electrolyte is an alkali aqueous solution; and the nickel-hydrogen secondary battery is suitably used as an energy source for an Electric Vehicle (EV) or a Hybrid-Electric Vehicle (HEV). On the other hand, specifically a lithium secondary battery may be produced by using a metal oxide such as $LiCoO_2$ as an anode active material and a carbon material as a cathode active material, by interposing a porous polymer separator between the cathode and anode, and by introducing a non-aqueous electrolyte liquid that contains lithium salt such as $LiPF_6$ into a gap between the cathode and anode. Lithium ions are released from the anode active material and move into a carbon layer of the cathode during a charging process while the lithium ions are released from the carbon layer and move back into the anode active material during a discharging process. The non-aqueous electrolyte liquid functions as a media through which the lithium ions move between the anode and cathode. Since lithium secondary batteries have high energy density, a high operation voltage and good storage characteristics, they may be applied to or used for various electronic products as well as used as an energy source for an EV or HEV.

A lithium secondary battery may be a box-shaped battery or a pouch-shaped battery which includes an electrode assembly and a pouch-shaped case that houses the electrode assembly. The pouch-shaped case may be formed by preparing a thin metal plate such as a thin aluminum plate and by performing insulation processing in which the surface of the thin metal plate is treated so as to be insulating. The insulation processing is performed by applying transformed polypropylene (polymer resin), for example, Casted Polypropylene as a thermally fused layer on the surface and forming a resin layer such as polyethylene terephthalate (PET) or nylon thereon. This structure is described as only an example of the lithium secondary battery. Accordingly, those skilled in the art will appreciate that the structure may vary according to the shape and kind of a battery.

One or more battery cells 21 are stacked to form the unit battery module 20. In order for the battery module 10 in which the unit battery modules 20 are stacked to have a compact size, the battery module 10 is structured to have a small thickness, a wide width, and a long length. For example, an electrode assembly is accommodated in a case made of a laminate sheet that includes a resin layer and a metal layer, and a first tab 22a and a second tab 22b which serve as electrode terminals protrude from the surface of the case. Specifically, the electrode assembly may be accommodated in a pouch-shaped case made of an aluminum laminate sheet.

The electrode assembly includes an anode, a cathode, and a separator. The separator is interposed between the anode and cathode which are stacked. The electrode assembly is called Jolly-roll winding type, stack type, or stack folding type according to a method of combining the anode, separator, and cathode. Details about these types are omitted because these types are well-known technologies.

The unit battery module 20 is the smallest unit of the battery module. It includes one or more battery cells 21 connected to one another. In the unit battery module, at least two or more electrode terminals are connected in series with each other, and connection portions of the electrode terminals are bent and stacked. The battery cells 21 may be covered by a cell cover 23 made of a rigid material such as aluminum. Specifically, the cell cover 23 is preferably formed of a heat-transferable metallic member for the purpose of heat sinking of the battery module 10.

As illustrated in FIG. 3, every two battery cells 21 are stacked with a partition 24 interposed therebetween when they are combined with each other, and the combined two stacked battery cells are accommodated in the cell cover 23, forming the unit battery module 20. In this case, the number of battery cells 21 included in one unit battery module 20 is not limited. The partition 24 disposed between the stacked battery cells 21 is optional. Therefore, those skilled in the art will appreciate that the partition 24 may be omitted, or an additional member may be included, in addition to the partition 24, in order to improve positional alignment of the battery cells 21 or reliability of combination. The battery cell 21 has the first tab 22a and the second tab 22b for electrical connection. The first tab 22a and the second tab 22b are distanced from each other and arranged on one side surface of each battery cell 21.

The battery module 10 includes at least one or more unit battery modules 20 which are stacked on each other. The number of stacked unit battery modules 20 included in the battery module 10, or a method of stacking the unit battery modules 20 is not particularly limited. According to the present invention, the stacked structure of the battery module 10 shown in the drawings is just an example.

The base substrate 30 supports the battery module 10 from the underside and may be a plate member made of a metal or any material. A coupling portion is formed on the outer circumferential surface of the base substrate 30 to combine the battery case 40 with the base substrate 30, and the form of the coupling portion varies depending on a coupling means. According to the present invention, the battery module 10 is seated on the base substrate 30 and then covered by the battery case 40, so that the battery module 10 is sealed inside the battery case 40. The battery case 40 is prepared by combining the first case 41 serving as a rear case with the second case 42 serving as a front case.

The battery module 10 includes a plurality of unit battery modules 20 stacked on the base substrate 30, in which each unit battery module 20 includes at least one or more battery cells 21 and is covered by the cell cover 23. As illustrated in FIG. 3, each battery cell 21 included in the battery module 10 may have the first tab 22a and the second tab 22b which protrude from one side surface of the unit battery module 20 and enable electrical connection. The first tab 22a and the second tab 22b are distanced from each other and arranged on one side surface of the unit battery module 20. Those skilled in the art will appreciate that the construction and arrangement of the electrode terminals of the first tab 22a and the second tab 22b vary depending on the kind of the battery cell 21. Since the battery module 10, the unit battery modules 20, and the battery cells 21 have been described above in detail, a repetitive description thereabout will not be given hear.

The battery case 40 accommodates the battery module 10 seated on the base substrate 30. The battery case 40 may be formed by combining the first case 41 serving as a rear case and the second case 42 serving as a front case so as to seal the accommodation space. As illustrated in FIG. 1, the second case 42 is disposed at the front part of the base substrate 30 in a manner of covering a portion of the upper surface, a first side surface (front surface), and portions of left and right side surfaces which are continuous from the first surface of the battery module 10 seated on the base substrate 30. The second case 42 may be formed at the front part of the base substrate 30 in a manner of covering a portion of the upper surface, the first surface (front surface), and portions of the left and right side surfaces which are continuous from the first surface of the battery module 10 so as to accommodate the battery module 10 therein by being combined with the first case 41. According to the present invention, the battery case 40 is prepared as separate two cases, the first case 41 and the second case 42, first. The first case 41 and the second case 42 are combined later to form the battery case 40. Because of this structure, the battery case 40 can press and be in pressure contact with an attached member such as a sensing member 50 attached to one side surface of the battery module 10 when the battery module assembly is manufactured, thereby more easily sealing the battery module 10. Furthermore, this structure has another advantage of enabling the battery module assembly to be more easily disassembled and reassembled when it is necessary to disassemble the battery module assembly 1 for a certain reason, for example, when abnormal operation of the battery module 10 accommodated inside the case 41 occurs. In addition, when a cooling device 70 described below is attached, the structure of the case has an advantage of effectively ensuring reliability of attachment of the cooling device 70, reliability of the contact between the battery module 10 and the cooling device, and reliability of functional operation of the battery module 10.

The sensing member 50 generally includes a printed circuit board and is attached to a second side surface of the battery module 10 on which the first tab 22a and the second tab 22b of the unit battery module 20 are formed. The sensing member 50 is preferably attached to the second side surface of the battery module 10 in a manner of being in pressure contact with the inside surface of the second case 42 so that attachment force between the sensing member 50 and the battery module 10 is maintained and effective sealing inside the battery case 40 is ensured. Since the second case 42 is combined in such a manner that the inside surface thereof presses the sensing member 50, effective sealing of the accommodation space of the battery case 40 is achieved and maintained. The sensing member 50 has a terminal portion 50a to be connected to an external terminal and a sensing member cover 51 that can cover the terminal portion 50a.

The cooling device 70 includes a heat sink plate 71 and cooling fins 72 that are attached to the heat sink plate 71 and may be cooled through air cooling. The cooling device 70 is attached to the first side surface of the battery module 10, which is opposite the second side surface to which the sensing member 50 is attached. The cooling device 70 is attached to the first case 41 to transfer heat generated from the battery module 10 accommodated in the first case 41, thereby cooling the battery module 10. As illustrated in FIG. 2, the heat sink plate 71 is attached in surface contact manner to the cell covers 23 of the unit battery modules 20 included in the battery module 10. Because of this surface contact, the heat generated from the battery module 10 is transferred to the cooling fins 72 attached to the heat sink plate 71. Accordingly, the cell covers 23 may be formed of a heat-conductive material. They may be formed of aluminum but not limited thereto. The cooling fins 72 have a protrusion form so that they can be connected to an additional cooler of a device to which the battery module assembly 1 is mounted. Here, the cooling fins 72 are preferably cooled through air cooling. However, those skilled in the art will appreciate that the cooling fins 72 exposed to the outside of the battery case 41 can be cooled by a certain cooling means using cooling water or other coolants.

A gas discharge tube 60 may be added to discharge harmful gases, which may be emitted from the battery cells 21 of the battery module 10 accommodated in the battery case 40, outside the battery case 40. The gas discharge tube 60 may be formed by incorporating a connection tube, which can communicate with the inside and outside of the battery case 40, in one side surface of the battery case 40. As illustrated in FIG. 4, when two battery module assemblies 1 are combined with each other, the gas discharge tubes 60 are connected to each other so that harmful gases, generated in the battery cases 40, are discharged outside through the connected gas discharge tubes 60. Although FIG. 4 illustrates exemplary arrangement and shape of the gas discharge tubes 60, the arrangement and shape of the gas discharge tubes according to the present invention are not limited to the illustration. Various shapes of gas discharge tubes 60 may be used as long as the gas discharge tubes can be connected to each other to discharge gases outside the battery case 40.

FIGS. 5 to 11 are diagrams illustrating a method of manufacturing a battery module assembly according to one embodiment.

The method of manufacturing a battery module assembly 1 according to one embodiment includes: preparing a base substrate 30; combining a first case 41 with the base substrate 30 in a manner such that a rear surface portion of the base substrate 30 is covered; forming a battery module 10 in the first case 41 by stacking at least one or more unit battery modules 20; attaching a sensing member 50 to a first side surface of the battery module 10 which is not covered by the first case 41; and combining a second case 42 with a front surface portion of the base substrate 30 in such a manner that an inside surface of the second case 42 comes in pressure contact with the sensing member 50, an end of the second case 42 meets an end of the first case 41, and the battery module 10 can be accommodated in the first case and the second case.

The method of manufacturing the battery module assembly 1 will be described in more detail with reference to FIGS. 5 to 11.

Figure 5:
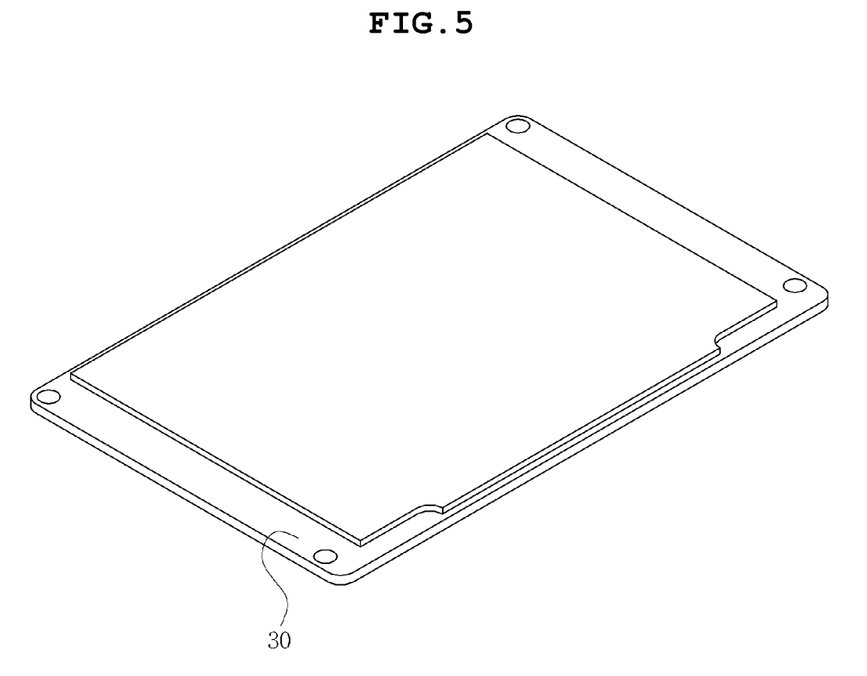
FIGS. 5 to 11 are diagrams showing a method of manufacturing a battery module assembly according to one embodiment.

First, as illustrated in FIG. 5, the base substrate 30 is prepared. The base substrate 30 described below is formed of a metallic material or other rigid materials so as to be able support the battery module 10, but the material of the base substrate 30 is not limited thereto.

Figure 6:
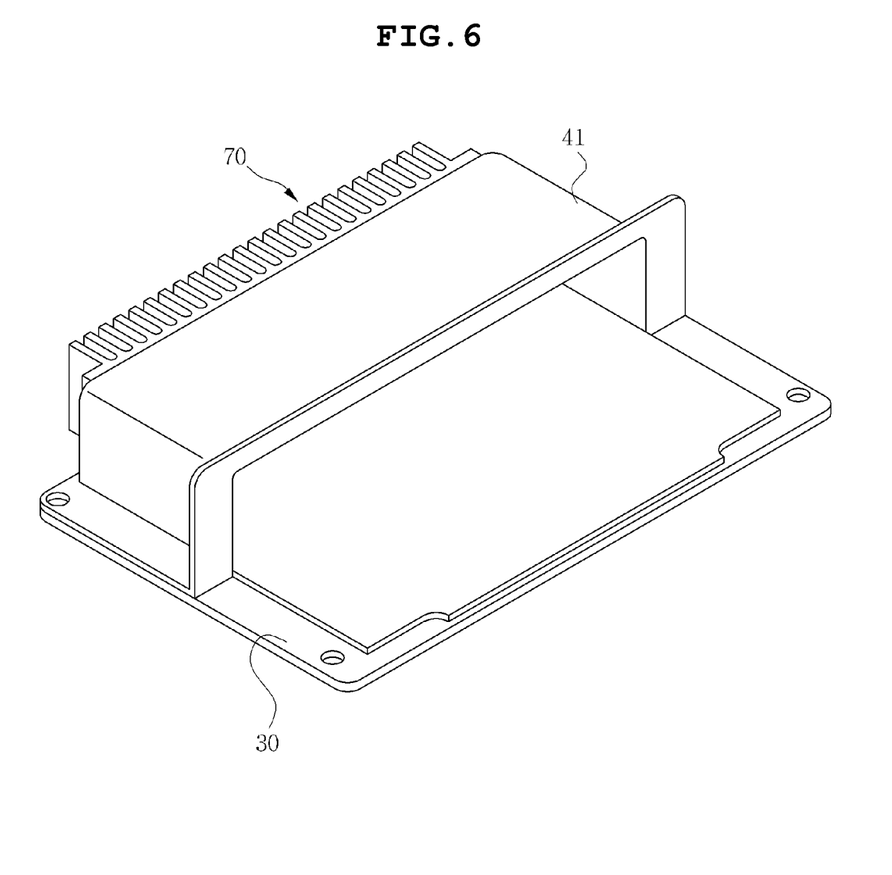

Next, as illustrated in FIG. 6, the first case 41 is combined with the base substrate 30 in a manner of covering the rear surface portion of the base substrate 30. At this point, a cooling device 70 may be attached to a first side surface of the first case 41 which is at a closed end of the first case 41. The cooling device 70 may include a heat sink plate 71 and cooling fins 72. Details about the cooling device 70 have been described above, so a repetitive description thereabout will not be given here. However, attachment of the cooling device 70 may be performed at a later stage instead of this stage unlike the example illustrated in FIG. 6. The attachment of the cooling device 70 may be performed by attaching the cooling device 70 to the first side surface of the first case 41 at any stage before manufacturing of the battery module assembly 1 is finished.

Figure 7:
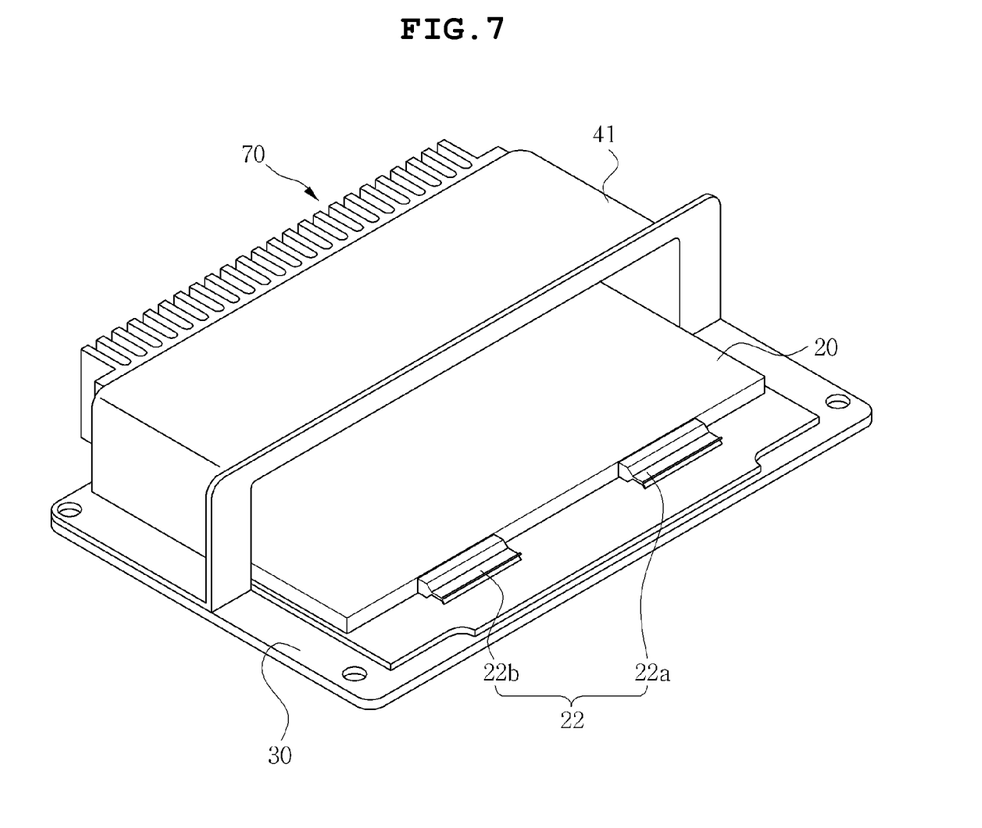
Figure 8:
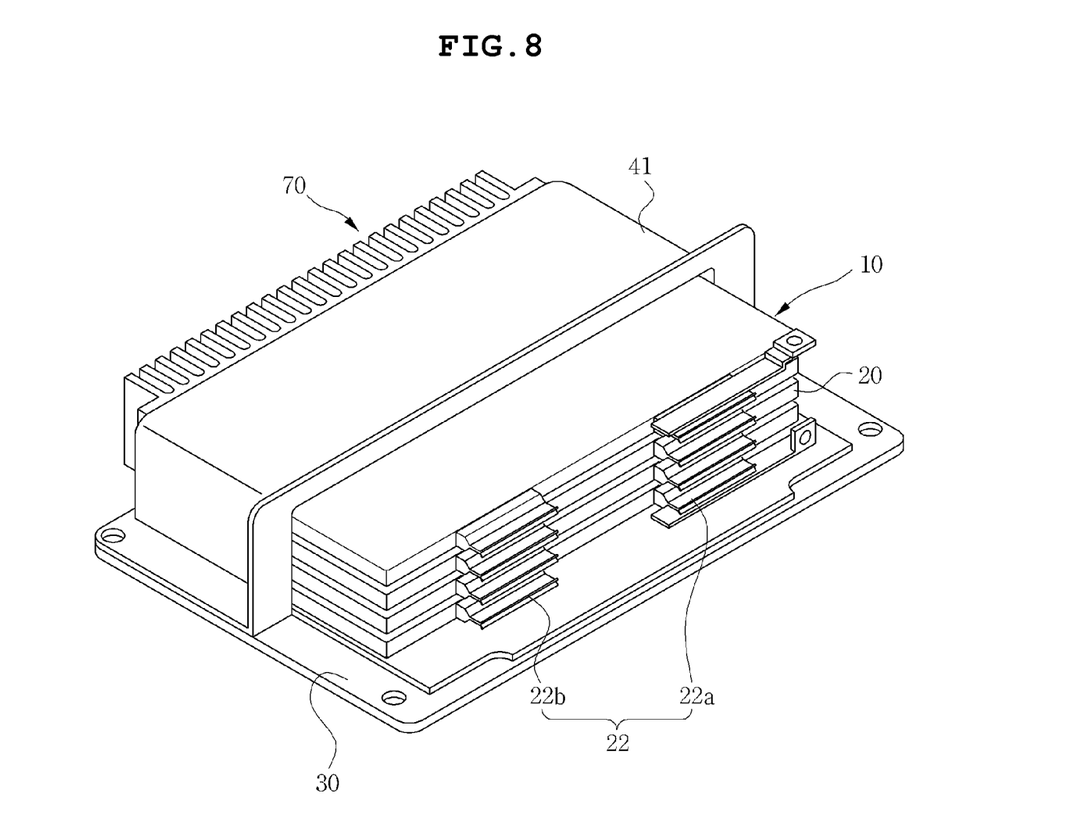

Next, as illustrated in FIGS. 7 and 8, the unit battery modules 20 are inserted into the first case 40 through the opening of the first case 41 and stacked in the first case 41. That is, the battery module 10 is formed on the base substrate 30 through this step. The unit battery modules 20 and the battery cells 21 included in the battery module 10 have been described in detail, so a repetitive description thereabout will not be given here.

Figure 9:
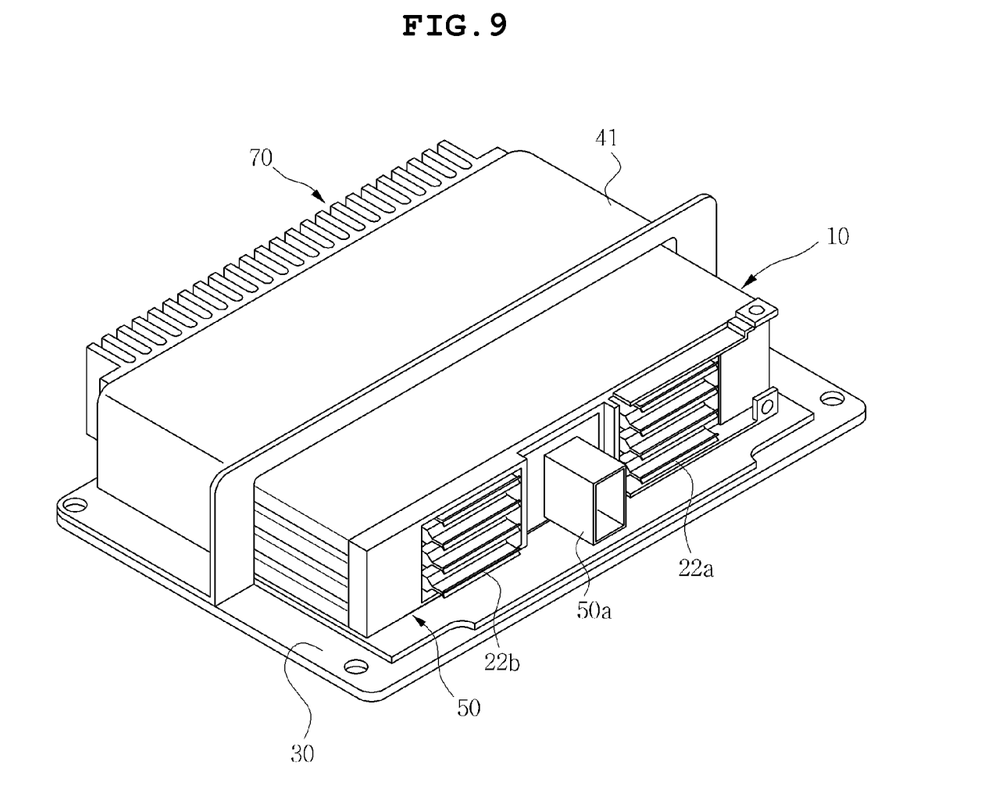

Next, as illustrated in FIG. 9, a sensing member 50 is attached to a second side surface of the battery module on which a first tab 22a and a second tab 22b are formed. The sensing member 50 may be formed of a printed circuit board but the material of the sensing member 50 is not limited thereto. The sensing member 50 may have a terminal portion 50a to be connected to an external terminal, at a middle portion thereof.

Figure 10:
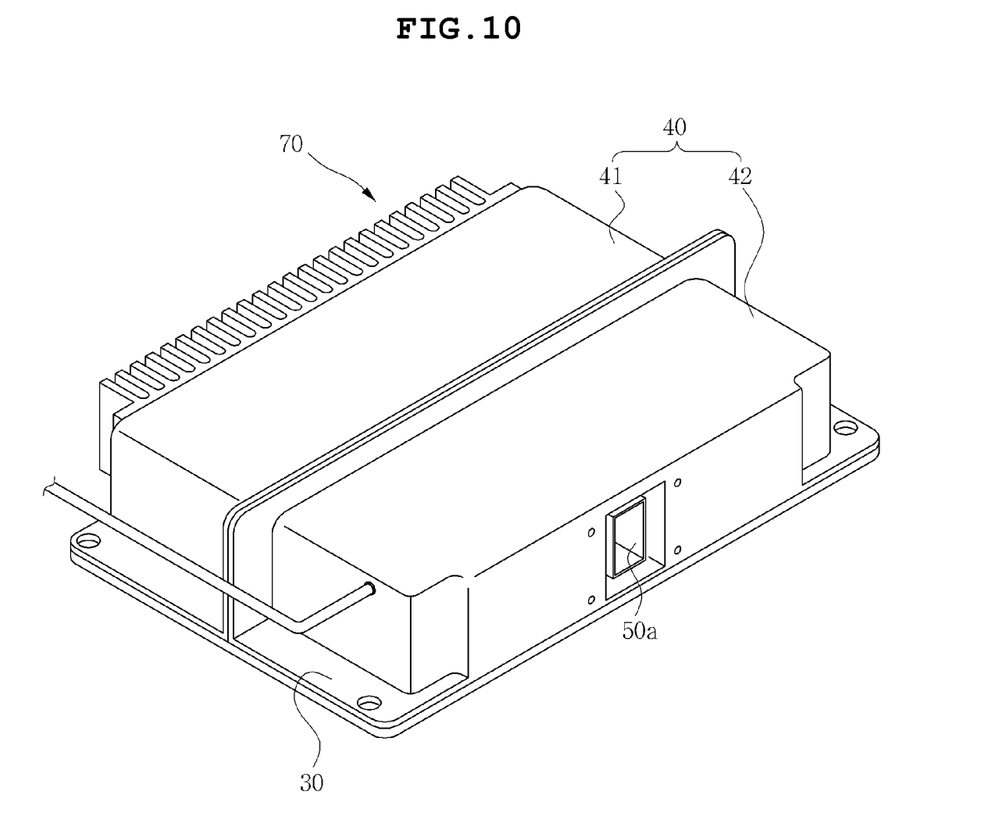

Next, as illustrated in FIG. 10, a second case 42 is combined to press the sensing member 50 toward the inside of the battery case. At this step, the inside surface of the second case 42 comes into pressure contact with the sensing member 50, and an open end of the second case 42 meets an open end of the first case 41. In this way, the second case 42 is combined with a front surface portion of the base substrate 30 so that the battery module 10 is accommodated in and sealed by the first and second cases 41 and 42.

Figure 11:
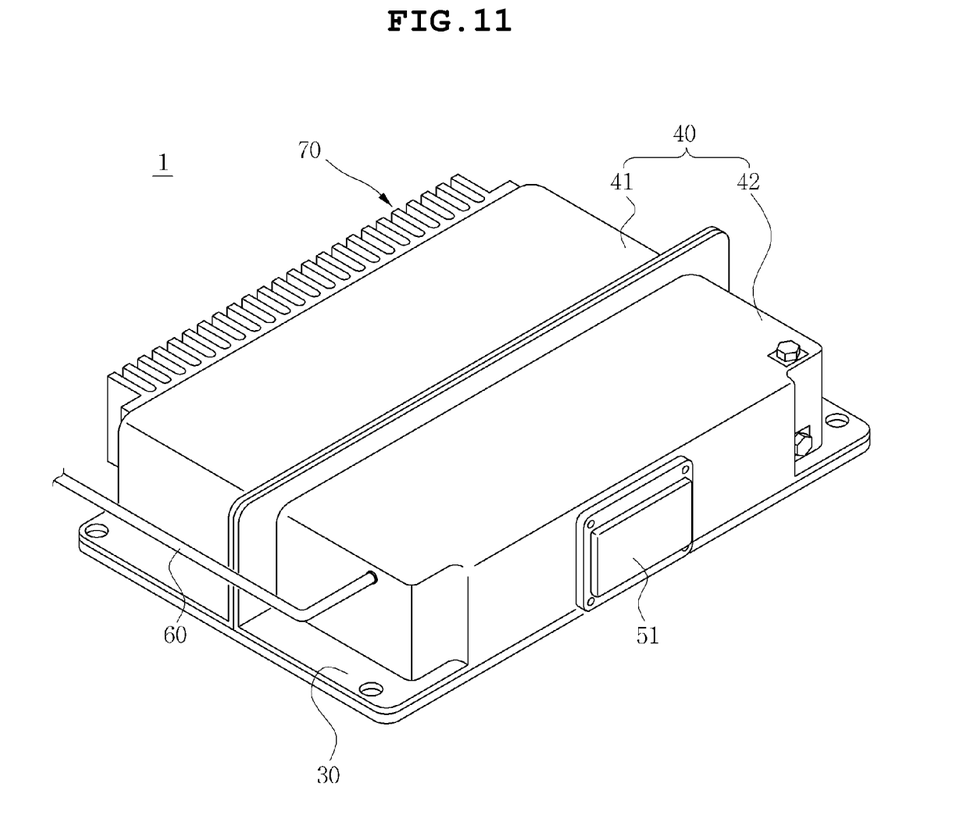

Next, as illustrated in FIG. 11, since the second case 42 is combined such that the terminal portion 50a of the sensing member 50 is not covered by the second case 42, an additional sensing member cover 51 may be installed to cover the terminal portion 50a. The method may further include a step of adding a gas discharge tube 60 through which harmful gases, generated from the battery module 10 accommodated in the battery case 40 that includes the first case 41 and the second case 42, are discharged outside (see FIG. 3). However, the shape and arrangement of the gas discharge tube 60 is not particularly limited according to position and space, but may suitably vary according to the structure and characteristic of devices to which the battery module assembly 1 is applied.

Since the structure of each element including the battery case 40, the battery module 10, the cooling device 70, and the sensing member 50 has been described above in association with the battery module assembly 1 according to one embodiment, a repetitive description about these elements will not be given here.

While the present invention has been described in conjunction with exemplary embodiments thereof, it is to be understood that the present description is not intended to limit the present invention to those exemplary embodiments but is described for only an illustrative purpose. Therefore, those skilled in the art will appreciate that various alternatives, modifications, and equivalents are possible without departing from the technical spirit of the present invention.

It is to be understood that various alternatives, modifications, equivalents and other embodiments may be included within the spirit and scope of the present invention, and the specific protection scope will be defined only by the appended claims.

DESCRIPTION OF THE REFERENCE NUMERALS IN THE DRAWINGS

1: Battery module assembly
10: Battery module
20: Unit battery module
21: Battery cell
22: Battery tab
22a: First tab
22b: Second tab
23: Cell cover
24: Partition
30: Base substrate
40: Battery case 41: First case
42: Second case
50: Sensing member
50a: Terminal portion
51: Sensing member cover
60: Gas discharge tube
70: Cooling device
71: Heat sink plate
72: Cooling fin

The invention claimed is:

1. A battery module assembly, comprising:
a base substrate with a coupling portion formed on an outer circumferential surface of the base substrate;
a battery module that includes a plurality of unit battery modules which is stacked on the base substrate, each unit battery module including one or more battery cells and being covered by a cell cover;
a battery case that is combined with the coupling portion of the base substrate and includes a first case and a second case combined with each other, the first case covering a rear surface portion of the battery module, the second case covering a front surface portion of the battery module, and the first case and the second case combined with the base substrate to form a sealed space in which the battery module is accommodated;
a sensing member that is attached to the second side surface of the battery module and that has a terminal portion to be connected to an external terminal; and
a gas discharge tube that extends from the sealed space to the outside of the battery case, wherein gases emitted from the battery cells and accumulated in the sealed space to increase an internal pressure of the sealed space are discharged to the outside of the battery case through the gas discharge tube by the internal pressure,
wherein the first case covers a portion of an upper surface, a first side surface, and portions of left and right side surfaces, which are continuous from the first side surface, of the battery module, and a contact portion of the first case coupled with the second case extends in directions of portions of the upper surface, and portions of the left and right side surfaces,
wherein the second case has a shape corresponding to the first case and covers a remaining portion of the upper surface, a second side surface, and remaining portions of the left and right side surfaces, which are continuous from the second side surface, of the battery module, and a contact portion of the second case coupled with the first case extends in directions of portions of the upper surface, and portions of the left and right side surfaces,
wherein the second case is combined with the first case such that an inside side surface of the second case presses the sensing member in the direction toward the first case except for the terminal portion, and the contact portion of the first case and the contact portion of the second case come into surface contact with each other.

2. The battery module assembly according to claim 1, wherein each of the stacked unit battery modules has a first tab and a second tab for electrical connection, which protrude from a second side surface thereof and are distanced from each other.

3. The battery module assembly according to claim 2, wherein the sensing member has a hole through which the first tab and the second tab pass.

4. The battery module assembly according to claim 1, further comprising:
a heat sink plate that is formed on an outside side surface of the first case and is in surface contact with the cell cover which protrudes from the unit battery module toward the heat sink plate; and
a cooling fin attached to the heat sink plate,
wherein the cell cover is formed of a heat conductive material and in surface contact with the battery cells.

5. The battery module assembly according to claim 1, comprising a partition that is disposed between the stacked battery cells, at a frame-shaped periphery portion of opposing surfaces of the battery cells, when two or more battery cells are combined with each other.

* * * * *